US008902791B2

(12) United States Patent
Awoniyi et al.

(10) Patent No.: US 8,902,791 B2
(45) Date of Patent: Dec. 2, 2014

(54) CONFIGURATION CONTROL OF INTER-CELL SIGNALING BASED ON POWER STATE

(75) Inventors: Olufunmilola O. Awoniyi, San Diego, CA (US); Osok Song, San Diego, CA (US); Bongyong Song, San Diego, CA (US); Andrea Garavaglia, Nuremburg (DE); Samir Salib Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 13/249,160

(22) Filed: Sep. 29, 2011

(65) Prior Publication Data

US 2012/0082064 A1 Apr. 5, 2012

Related U.S. Application Data

(60) Provisional application No. 61/389,163, filed on Oct. 1, 2010.

(51) Int. Cl.
*H04L 12/28* (2006.01)
*H04W 52/34* (2009.01)
*H04W 24/10* (2009.01)
*H04W 52/02* (2009.01)

(52) U.S. Cl.
CPC ............ *H04W 24/10* (2013.01); *H04W 52/343* (2013.01); *H04W 52/0206* (2013.01)
USPC .......................................................... 370/255

(58) Field of Classification Search
CPC .................................................... H04W 24/10
USPC .......................................................... 370/255
See application file for complete search history.

(56) References Cited

U.S. PATENT DOCUMENTS

| 2008/0227457 | A1  | 9/2008  | Wu |
| 2009/0047968 | A1* | 2/2009  | Gunnarsson et al. ......... 455/446 |
| 2009/0264126 | A1* | 10/2009 | Khetawat et al. .......... 455/435.1 |
| 2010/0002614 | A1* | 1/2010  | Subrahmanya ............... 370/311 |

(Continued)

FOREIGN PATENT DOCUMENTS

| CN | 102104881 A    | 6/2011 |
| WO | WO2010077193 A1 | 7/2010 |
| WO | 2011009415     | 1/2011 |

OTHER PUBLICATIONS

Self-Optimizing Networks: Benefits of SON in LTE 4G Americas, Jul. 2011, pp. 1-69.

(Continued)

*Primary Examiner* — Mark Rinehart
*Assistant Examiner* — Christopher R Crompton
(74) *Attorney, Agent, or Firm* — Novak Druce Connolly Bove + Quigg LLP

(57) ABSTRACT

An access point may control reporting configurations based on current power state of a cell in wireless communications network. The first cell may provide reporting configuration instructions to a second cell, instructing selection between at least two defined configurations for reporting system information or load information from the second cell, based on whether the first cell is in a powered up state or a powered down state. The first cell may transmit notifications to the second cell indicating when the first cell is transitioning to a current power state, which may be one of the powered up state or the powered down state. The first cell may select one of the at least two configurations for interpreting reporting data received from the second cell, based its current power state, to obtain the system information or the load information from the second cell.

40 Claims, 12 Drawing Sheets

(56) References Cited

U.S. PATENT DOCUMENTS

| | | |
|---|---|---|
| 2010/0190533 A1* | 7/2010 | Black et al. .................... 455/571 |
| 2010/0234013 A1* | 9/2010 | Schmitt ...................... 455/422.1 |
| 2010/0240410 A1* | 9/2010 | Peisa et al. .................... 455/522 |
| 2011/0044284 A1* | 2/2011 | Voltolina et al. .............. 370/331 |
| 2011/0105112 A1 | 5/2011 | Cave et al. |
| 2012/0015657 A1* | 1/2012 | Comsa et al. ................. 455/436 |

OTHER PUBLICATIONS

3GPP TSG RAN WG3 Meeting #69, "Rel-10 enhancements for inter-RAT cell load reporting", R3-102269, Madrid, Spain, (Aug. 2010).

3GPP TSG RAN WG3 Meeting #69bis, "RIM-based Signalling in Inter-RAT Network Energy Saving", R3-102914, Xi'an, China, (Oct. 2010).

Huawei: "Overview to LTE energy saving solutions to cell switch off/on", 3GPP Draft; R3-100162, 3rd Generation Partnership Project (3GPP), Mobile Competence Centre ; 650, Route Des Lucioles ; F-06921 Sophia-Antipolis Cedex ; France, vol. RAN WG3, no. Valencia, Spain; 20100118, Jan. 15, 2010, XP050424028, [retrieved on Jan. 15, 2010].

International Search Report and Written Opinion—PCT/US2011/054461—ISA/EPO—Jan. 13, 2012.

* cited by examiner

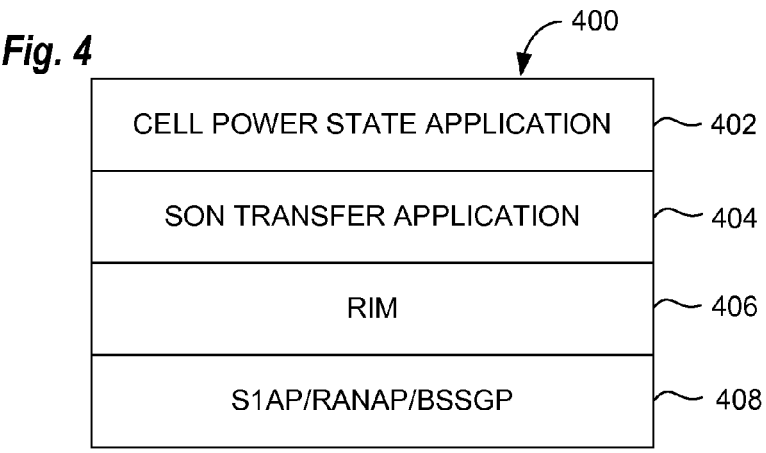
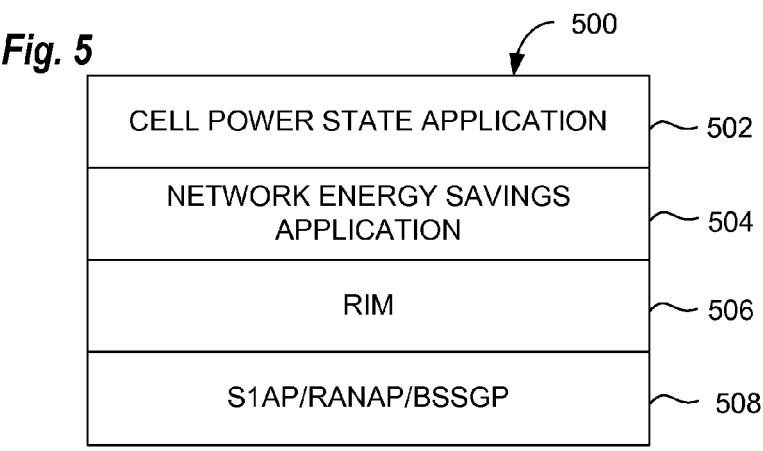
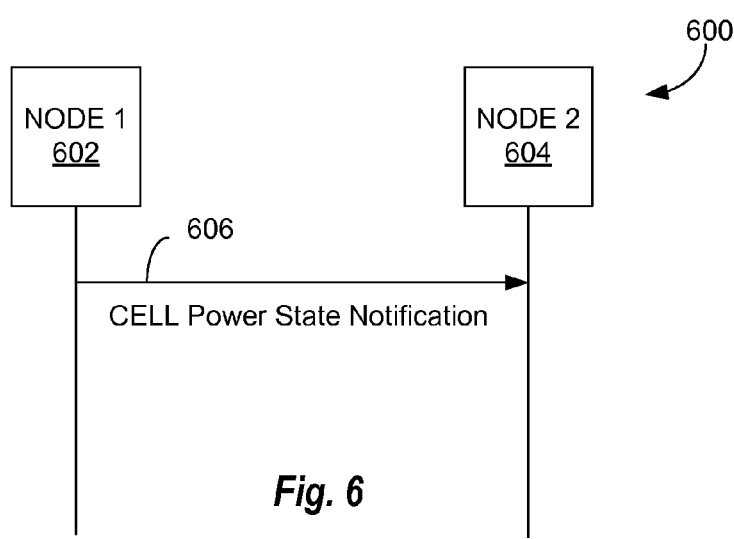

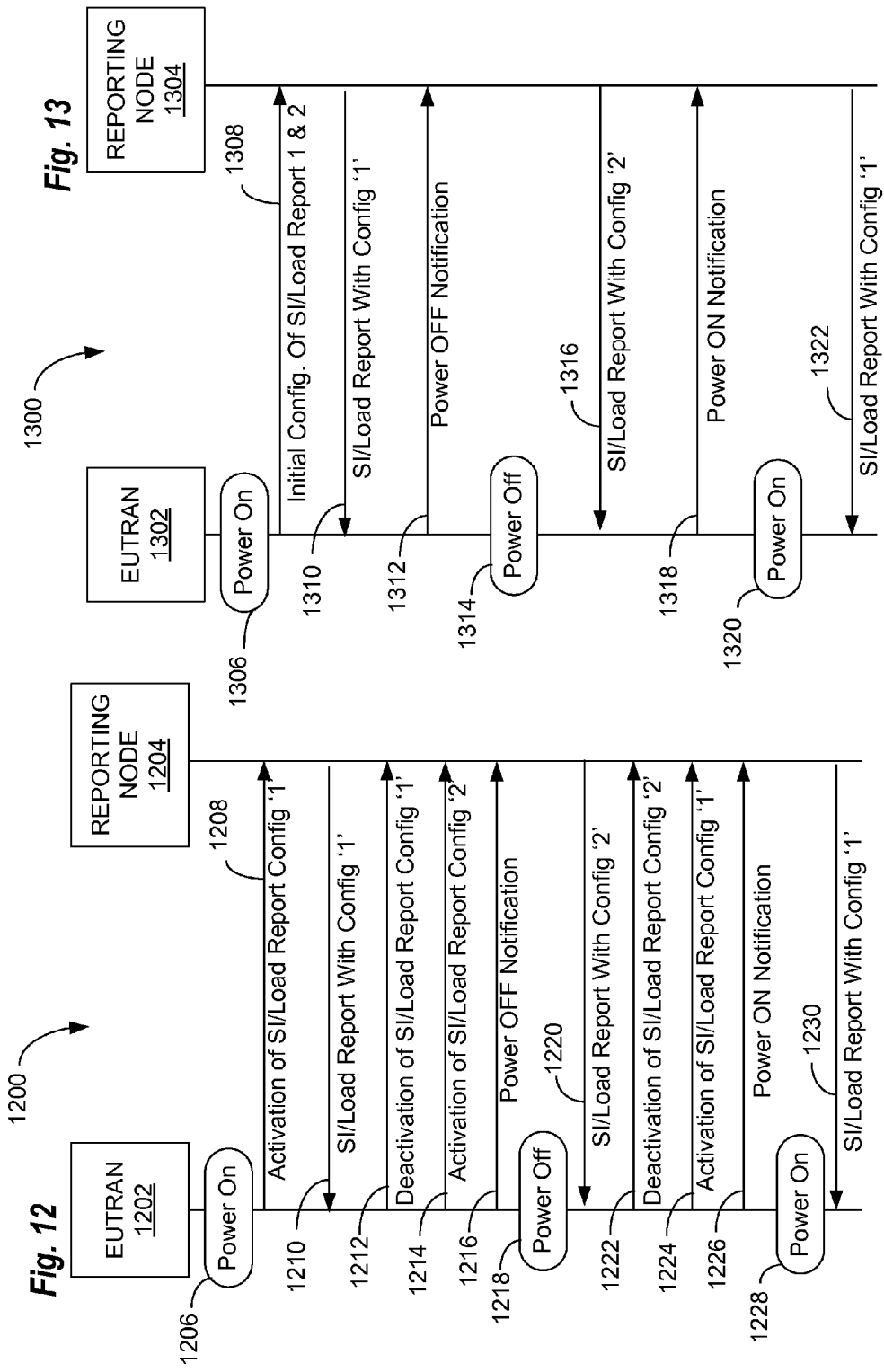

1402 — PROVIDING REPORTING CONFIGURATION INSTRUCTIONS TO ONE OR MORE SECOND CELLS, INSTRUCTING THE ONE OR MORE SECOND CELLS TO SELECT ONE OF AT LEAST TWO DEFINED CONFIGURATIONS FOR REPORTING AT LEAST ONE OF SYSTEM INFORMATION OR LOAD INFORMATION TO A FIRST CELL, BASED ON WHETHER THE FIRST CELL IS IN A POWERED UP STATE OR A POWERED DOWN STATE

1404 — TRANSMITTING NOTIFICATIONS FROM THE FIRST CELL TO THE ONE OR MORE SECOND CELLS INDICATING WHEN THE FIRST CELL IS TRANSITIONING TO A CURRENT POWER STATE SELECTED FROM THE POWERED UP STATE AND THE POWERED DOWN STATE

1406 — SELECTING ONE OF THE AT LEAST TWO DEFINED CONFIGURATIONS FOR INTERPRETING DATA RECEIVED FROM THE SECOND CELL, BASED ON THE CURRENT POWER STATE, TO OBTAIN AT LEAST ONE OF THE SYSTEM INFORMATION OR THE LOAD INFORMATION

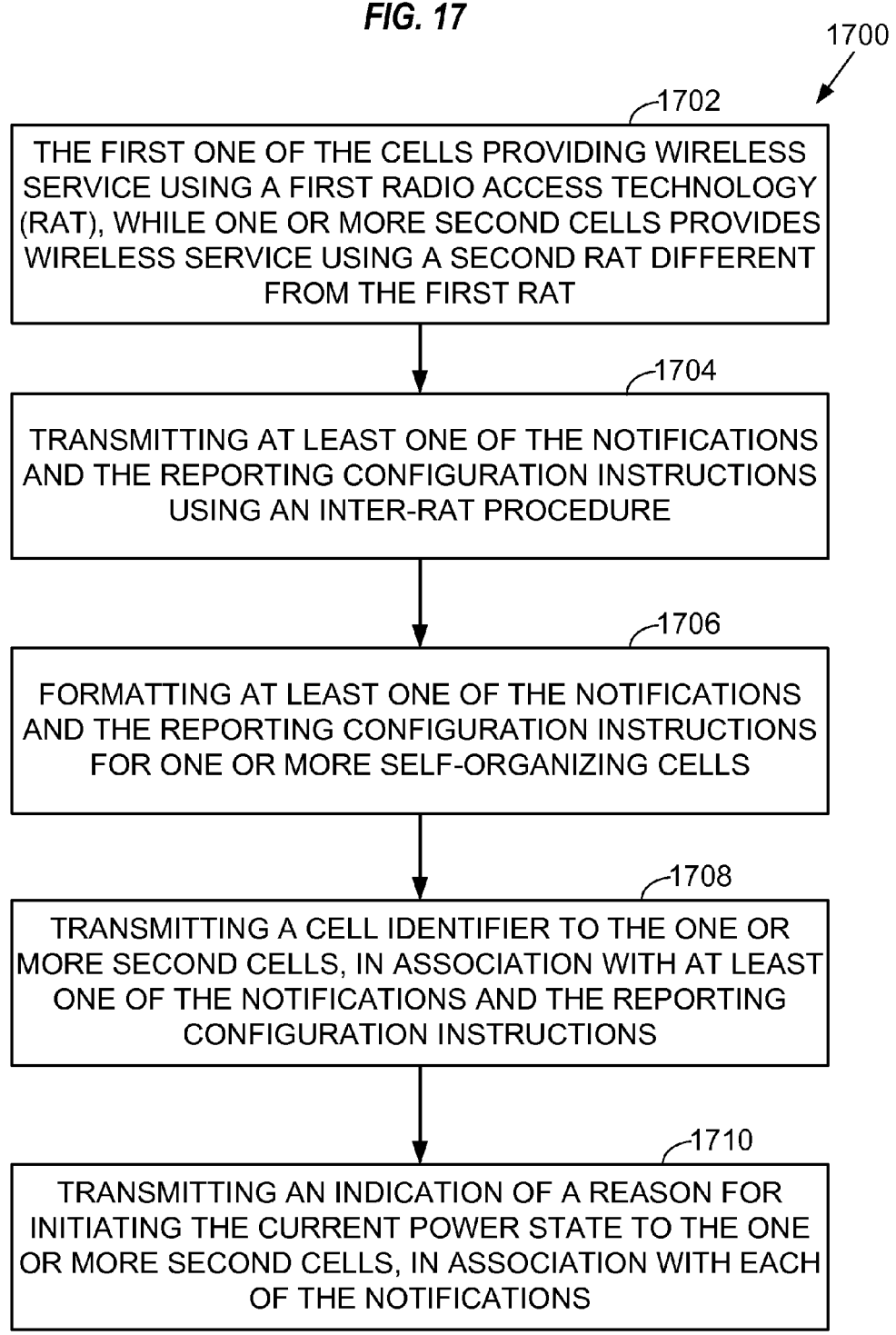

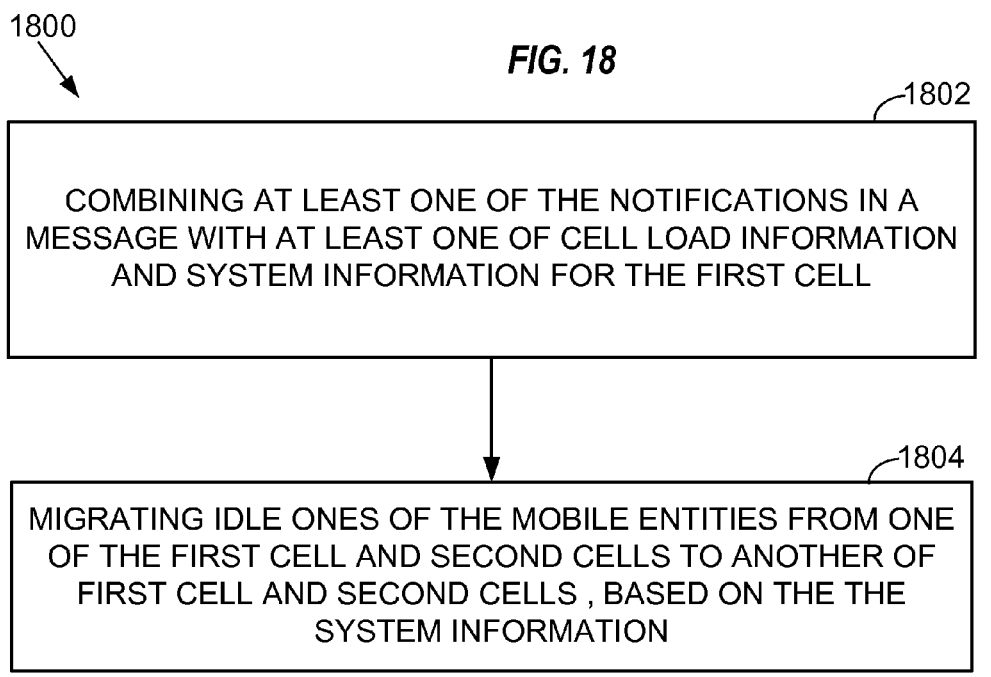

CONFIGURATION CONTROL OF INTER-CELL SIGNALING BASED ON POWER STATE

CROSS-REFERENCE TO RELATED APPLICATION

This application claims priority pursuant to 35 U.S.C. §119 (e) to U.S. provisional application Ser. No. 61/389,163, filed Oct. 1, 2010, which is hereby incorporated by reference in its entirety.

FIELD

Aspects of the present disclosure relate generally to wireless communication systems, and more particularly, to configuration control of signaling between cells of one or more wireless communication networks, including between cells using different Radio Access Technologies (RATs).

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Such multiple-access systems may use various RATs, for example, code division multiple access (CDMA), time division multiple access (TDMA), frequency division multiple access (FDMA), 3GPP Long Term Evolution (LTE), and orthogonal frequency division multiple access (OFDMA) systems.

Generally, a wireless multiple-access communication system can simultaneously support communication for multiple wireless access terminals. Each access terminal communicates with one or more base stations, also called access points, via transmissions on the downlink and uplink. The downlink refers to the communication link from the base stations to the access terminals, and the uplink refers to the communication link from the access terminals to the base stations. This communication link may be established via a single-in-single-out, multiple-in-single-out or a multiple-in-multiple-out (MIMO) system. Each base station may service one or more cells providing wireless coverage over an area determined by characteristics of an antenna group for the cell and by changing conditions of the wireless system, including but not limited to interference from neighbor base stations or other radio conditions, and time-dependent wireless resource demand within the cell.

Mobile phone and data service to a particular access terminal may be provided by multiple cells with overlapping coverage areas, using multiple different RATs. The demand for wireless voice and data service in a particular geographic area may vary in a generally predictable or unpredictable fashion, in response to demand from individual users of the access terminals. It is desirable to manage these fluctuations in demand in an efficient manner, with or without overlapping coverage from base stations using different RATs.

SUMMARY

In an aspect, a base station may perform a method for controlling reporting configurations for cells of one or more wireless communications networks based on current power state of a cell. The base station or cells may include cell infrastructure belonging to separate operators, or may include cell infrastructure shared by two or more operators, or may be owned and controlled entirely by a single operator. The method may include providing reporting configuration instructions to one or more second cells, instructing the one or more second cells to select one of at least two defined configurations for reporting at least one of system information or load information to a first cell, based on whether the first cell is in a powered up state or a powered down state. The method may further include transmitting notifications from the first cell to the one or more second cells indicating when the first cell is transitioning to a current power state selected from the powered up state and the powered down state. The method may further include selecting one of the at least two defined configurations for interpreting data received from the second cell, based on the current power state, to obtain at least one of the system information or the load information. Accordingly, the first and second cell may avoid the need to define system information or load reporting configuration every time the first cell transitions its power state.

It should be appreciated that an appropriate or optimal configuration for the second cell while the first cell is in the powered up state should be different from when the first cell in a powered down state. Using the same reporting configuration for reports from the second cell to the first cell regardless of the state of the first cell may be inefficient, at best.

The reporting configuration instructions may persist indefinitely through several power up/power down cycles of the first cell, without being provided again by the first cell. The second cells may retain the instructions in a memory and use them for configuring system information reports or load information reports to the first cell, until such time as the first cell provides replacement instructions.

In another aspect, the method may include the first cell transitioning to at least one of the powered up state characterized by providing wireless service to mobile entities, and the powered down state characterized by maintaining communication capability between the first cell and the one or more second cells without providing wireless service to the mobile entities. Transitioning to a powered down state therefore may not entail powering every component of the first cell entirely off, although mobile service components of the first cell may be generally powered off. In a related aspect, the method may further include controlling wireless service to the mobile entities at the one or more second cells, based on whether the first cell is in a powered up state or a powered down state. In general, wireless services provided by the first cell to one or more mobile entities may be provided by the second cell while the first cell is in a powered down state. It should be appreciated that the first cell may consume less power when in a powered down state, and one benefit from transitioning between powered up and powered down states may be to provide a more efficient use of power system-wide.

In another aspect, the method may include broadcasting at least one of the notifications and the reporting configuration instructions to at least two of the one or more second cells. More than one of the second cells may receive the instructions from the same broadcast signal, and may configure subsequent reports accordingly.

In another aspect, the method may include transmitting at least one of the notifications and reporting configuration instructions using a Radio Access Network (RAN) Information Management (RIM) procedure. In some embodiments, the method may be performed in a context wherein the first one of the cells provides wireless service using a first radio access technology (RAT), and the one or more second cells provides wireless service using a second RAT different from the first RAT. In such embodiments, the method may include transmitting at least one of the notifications and the reporting configuration instructions using an inter-RAT procedure. In a related aspect, the method may include formatting at least one of the notifications and the reporting configuration instructions for one or more self-organizing nodes (SONs) or cells.

In another aspect, the method may include transmitting a cell identifier to the one or more second cells, in association with at least one of the notifications and the reporting configuration instructions. In addition, the method may include transmitting an indication of a reason for initiating the current power state to the one or more second cells, in association with each of the notifications.

In another aspect, the method may include combining at least one of the notifications in a message with at least one of cell load information and system information for the first cell. Accordingly, the method may further include migrating idle ones of the mobile entities from the one or more second cells to the first cell, based on the system information or vice versa.

In another aspect, the method may include selecting the one of at least two configurations at the one or more second cells, based on receiving each of the notifications from the first cell. Accordingly, the method may further include determining which system information is reported by the one or more second cells to the first cell, based on a selected one of the at least two configurations. In other words, the method may include the second cell following the reporting configuration instructions from the first cell based on its reported current power state. Such operations by the second cell may enable the first cell to correctly process data received from the second cell, based on its current power state, to obtain the system information or the load information.

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as base stations of various types used for wireless communications. Similarly, an article of manufacture may be provided, including a non-transient computer-readable storage medium holding encoded instructions, which when executed by a processor, cause a wireless communications apparatus to perform the methods and aspects of the methods as summarized above.

BRIEF DESCRIPTION OF THE DRAWINGS

The features, nature, and advantages of the present disclosure will become more apparent from the detailed description set forth below when taken in conjunction with the drawings described below. Throughout the drawings and detailed description, like reference characters may be used to identify like elements appearing in one or more of the drawings.

FIG. 4 illustrates an example protocol stack for a cell power state application with modified Self-Organizing Node (SON) transfer application.

FIG. 5 illustrates an example protocol stack for a cell power state application with a network energy savings application.

FIG. 6 illustrates an example of a cell power state notification.

FIG. 12 illustrates an example of SI/load reporting without predefined reporting configurations.

FIG. 13 illustrates an example of enhanced SI/load reporting with predefined configurations based on cell power state.

FIGS. 14-19 are flow diagrams illustrating methodologies for controlling reporting configurations for cells of one or more wireless communications networks based on current power state of a cell, and related aspects.

DETAILED DESCRIPTION

Figure 1:
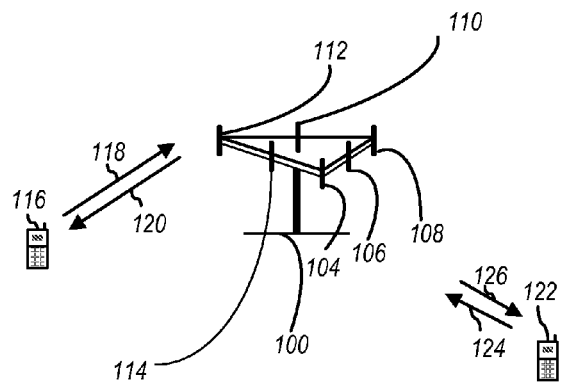
FIG. 1 illustrates a multiple access wireless communication system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as, for example, Universal Terrestrial Radio Access (UTRA) or CDMA 2000. UTRA includes Wideband CDMA (WCDMA) and other variants of CDMA. CDMA 2000 may be described by IS-2000, IS-95 and IS-856 standards. A TDMA network may implement a radio technology such as, for example, Global System for Mobile Communications (GSM). An OFDMA network may implement a radio technology such as, for example, Evolved UTRA (E-UTRA), Ultra Mobile Broadband (UMB), IEEE 802.11 (Wi-Fi), IEEE 802.16 (WiMAX), IEEE 802.20, and Flash-OFDMA. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA 2000 and UMB are described in documents from an organization named "3rd Generation Partnership Project 2" (3GPP2). The techniques described herein may be used for the wireless networks and radio technologies mentioned above as well as other wireless networks and radio technologies. By way of example only, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Aspects of the present disclosure may be adapted for use in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors. In 3GPP, the term "cell" can refer to a coverage area of an eNB and/or an eNB subsystem serving this coverage area, depending on the context in which the term is used.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, femto access point, and so on.

Referring to FIG. 1, a multiple access wireless communication system according to one embodiment is illustrated. An access point 100 (AP) may include multiple antenna groups, for example one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over downlink 120 and receive information from access terminal 116 over uplink 118. Access terminal 122 is in communication with antennas 106 and 108, where antennas 106 and 108 transmit information to access terminal 122 over downlink 126 and receive information from access terminal 122 over uplink 124. In a Frequency Division Duplex (FDD) system, communication links 118, 120, 124 and 126 may use different frequencies for communication. For example, downlink 120 may use a different frequency then that used by uplink 118.

Each group of antennas and/or the area in which they are designed to communicate is often referred to as a sector of the access point. In the illustrated system, antenna groups each are designed to communicate to access terminals in a sector, of the areas covered by access point 100.

In communication over downlinks 120 and 126, the transmitting antennas of access point 100 may utilize beam forming in order to improve the signal-to-noise ratio of downlinks for the different access terminals 116 and 124. An access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an evolved Node B (eNB), macro cell, macro cell base station or some other terminology. An access terminal may also be called an access terminal, user equipment (UE), a wireless communication device, terminal, access terminal or some other terminology.

Figure 2:
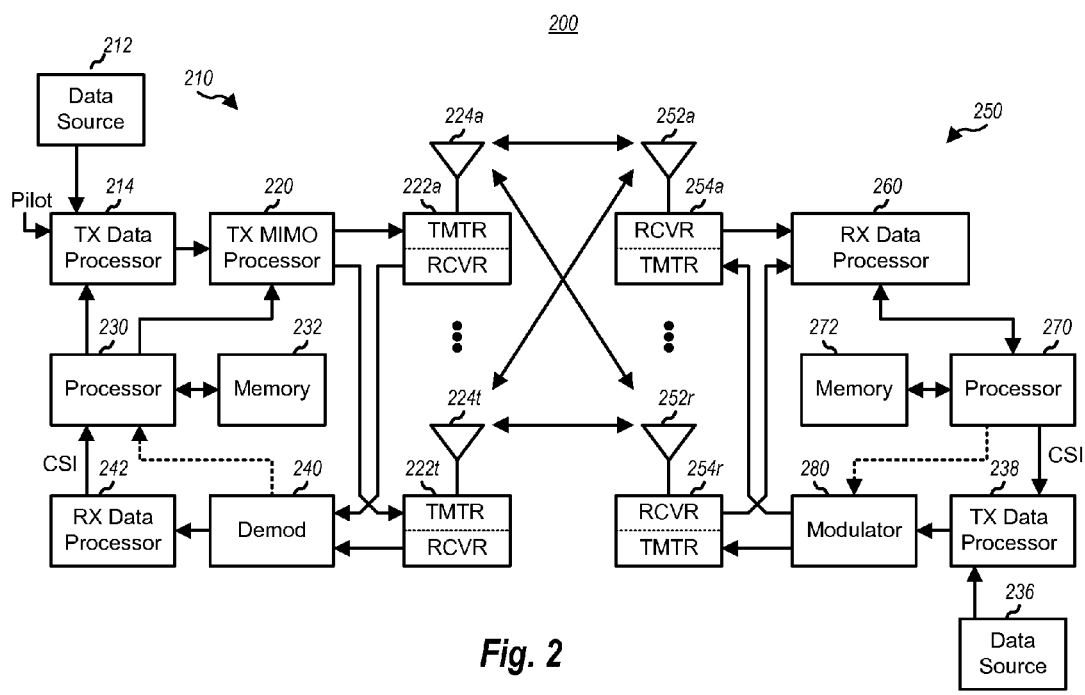
FIG. 2 illustrates a block diagram of a transmitter/receiver system illustrating related aspects of a wireless access point and access terminal.

FIG. 2 is a block diagram showing aspects of a transmitter system 210 and a receiver system 250 in a Multiple-Input Multiple-Output (MIMO) system 200. Aspects of the transmitter system may be adapted for an access point, for example a base station, for performing a method for controlling reporting configurations for cells based on current power state as described herein. Aspects of the receiver system may be adapted for an access terminal, for example a mobile station or user equipment, in communication with the access terminal. The transmitter system 210 and receiver systems 250 exemplify a suitable transmitter-receiver system in which other, more detailed aspects of the present disclosure may be practiced. It should be apparent that these more detailed aspects may also be practiced using other transmitters, receivers, or transmitter-receiver systems, and is not limited to the particular architecture illustrated in FIG. 2. It should be further apparent that a transmitter system that incorporates inventive aspects of the present disclosure will generally include other components or aspects as described elsewhere herein.

At the transmitter system 210, traffic data for a number of data streams is provided from a data source 212 to a transmit (TX) data processor 214. In some transmitter systems, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams may then be provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals may be received by NR antennas 252a through 252r. The received signal from each antenna 252 may be provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 may then receive and process the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 may process received data and generate appropriate response signals according to a control methodology, using data and instructions in the operatively coupled memory 272. The methodology may include controlling reporting configurations for cells of one or more wireless communications networks based on current power state of a cell, as described in more detail elsewhere herein.

The reverse link message may comprise various types of information regarding the communication link and/or the received data stream. The reverse link message may then be processed by a TX data processor 238, which may also receive traffic data for a number of data streams from a data source 236 to provide uplink signals. The uplink signals may be modulated by a modulator 280, conditioned by transmitters 254a through 254r, and transmitted back to transmitter system 210.

At transmitter system 210, the modulated uplink signals from receiver system 250 may be received by antennas 224, conditioned by receivers 222, demodulated by a demodulator 240, and processed by a RX data processor 242 to extract a reverse link message transmitted by the receiver system 250. Processor 230 may then determine which pre-coding matrix to use for determining the beamforming weights then processes the extracted message, using data and instructions stored in a memory 232 operable associated with the processor 230. The processor 230 may also generate messages for transmitting to the receiver system 250, to a macro base station, or to other femto base stations, and initiate other actions to control reporting configurations for cells of one or more wireless communications networks based on current power state of a cell, as described in more detail elsewhere herein. Instructions and data for performing these operations may be stored in the memory 232, and loaded into the processor 230 for execution at appropriate times.

In an aspect, logical channels used for exchanging information between a transmitter and receiver may be classified into Control Channels and Traffic Channels. Logical Control Channels comprises Broadcast Control Channel (BCCH) which may be a downlink (DL) channel for broadcasting system control information. A Paging Control Channel (PCCH) may be a DL channel that transfers paging information. A Multicast Control Channel (MCCH) may be a point-to-multipoint DL channel used for transmitting Multimedia Broadcast and Multicast Service (MBMS) scheduling and control information for one or several Multicast Traffic Channels (MTCHs). Generally, after establishing an RRC connection this channel may be used by access terminals capable of receiving and using MBMS signals. A Dedicated Control Channel (DCCH) may be a point-to-point bi-directional channel that transmits dedicated control information for use by access terminals having an RRC connection. In aspect, Logical Traffic Channels may further include a Dedicated Traffic Channel (DTCH), which may be a point-to-point bi-directional channel, dedicated to one UE, for the transfer of user information. Also, an MTCH may be a Point-to-multipoint DL channel for transmitting traffic data.

In an aspect, Transport Channels may be classified into DL and uplink (UL.) DL Transport Channels may include a Broadcast Channel (BCH), Downlink Shared Data Channel (DL-SDCH) and a Paging Channel (PCH). UL Transport Channels may include a Random Access Channel (RACH), a Request Channel (REQCH), a Uplink Shared Data Channel (UL-SDCH) and plurality of physical (PHY) channels. The PHY channels may include a set of DL channels and UL channels. The foregoing channels are merely examples of channels used in modern wireless communication systems, and are not meant to represent and exclusive or exhaustive list of channels. These and other channels may be used to implement more detailed aspects of the present disclosure.

Figure 3:
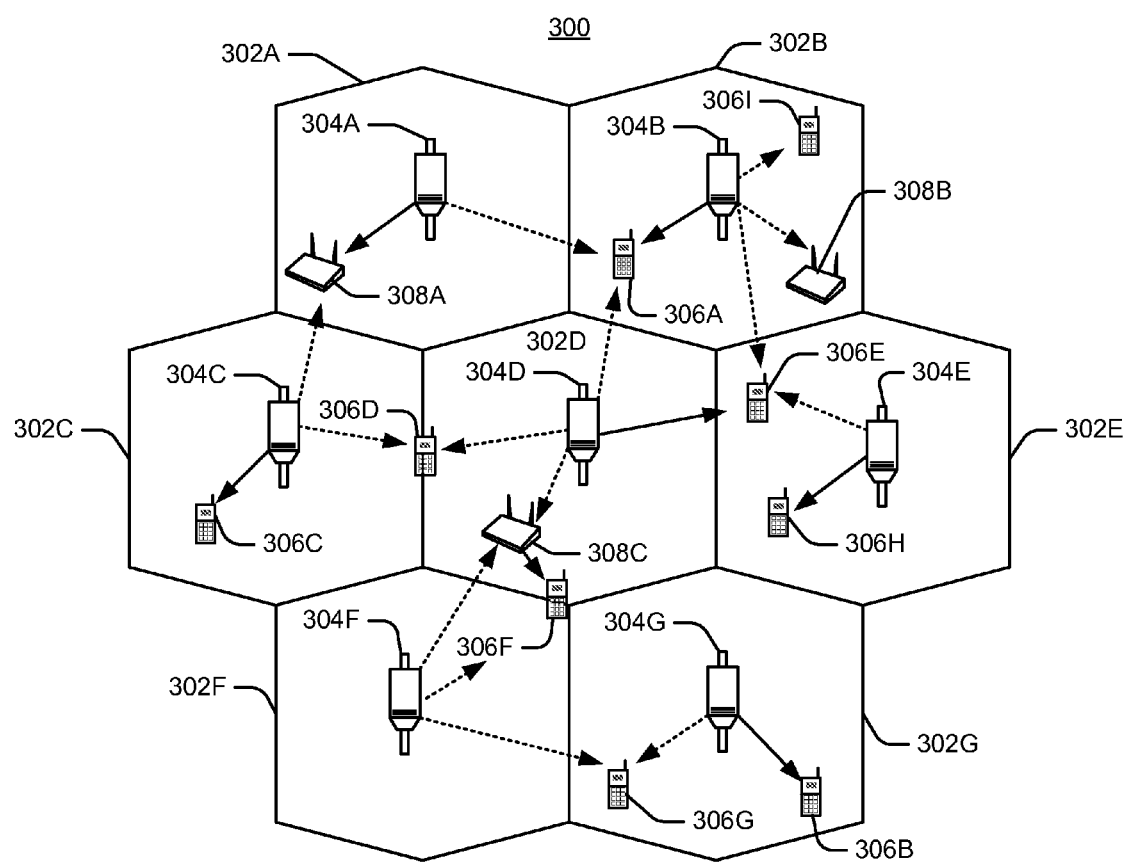
FIG. 3 illustrates aspects of a multi-cell wireless communication system that may include predefined reporting configuration between cells based on power state.

FIG. 3 illustrates a wireless communication system 300, configured to support a number of users, in which the teachings herein may be implemented. The system 300 provides communication for multiple cells 302, such as, for example, macro cells 302A-302G, with each cell being serviced by a corresponding access point 304 (e.g., access points 304A-304G). Although non-overlapping cells are illustrated, it should be appreciated that one or more of the cells 304A-304G may overlap in whole or in part another of these cells. One or more network controllers (not shown) may couple to a set of base stations (e.g., group 304A-304G or a subset thereof) and provide coordination and control for these access points. Each network controller may communicate with the access points to which it is connected via a backhaul. The access points in group 304A-304G may also communicate with one another, e.g., directly or indirectly via wireless or wireline backhaul. Each access point in the group 304A-304G may be connected to other access points in the group via a first broadband backhaul network (not shown). The access points in group 304A-304G may be operated by one or more operators, or may be shared by different operators. The access points in group 304A-304G may use the same RAT, or may use different RATs from one another, to communicate with the access terminals. In some implementations, an access point 304 may support multiple RATs.

The system may include additional, lower power access points 308A-308C, for example, femto base stations. Accordingly, the system 300 may be considered a heterogeneous network that includes access points of different types, e.g., macro eNBs, pico eNBs, femto eNBs, relays, etc. These different types of access points may have different transmit power levels, different coverage areas, and different impact on interference in the wireless network 100. For example, macro eNBs may have a high transmit power level (e.g., 5 to 40 Watts) whereas picocell base stations, femtocell base stations and relays may have a lower transmit power level (e.g., 0.1 to 2 Watt). In addition, the different types of access points may use different RATs to communicate with the access terminals 306A-306I.

The access terminals 306A-306I may be dispersed throughout the wireless network system 300, and each access terminal may be stationary or mobile. An access terminal may also be referred to as a UE, a terminal, a mobile station, a mobile entity, a subscriber unit, a station, or other terminology. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 3, a solid arrow line indicates desired transmissions between an access terminal and a serving base station, which is base station designated to serve the access terminal on the downlink and/or uplink. A dashed arrow line indicates interfering transmissions between a base station and a terminal.

As shown in FIG. 3, access terminals 306 (e.g., access terminals 306A-306I) may be dispersed at various locations throughout the system, which locations may change over time. Each access terminal 306 may communicate with one or more access points 304 on a downlink and/or an uplink at a given moment, depending upon whether the access terminal 306 is active and whether it is in soft handoff, for example. Different protocols may be used on the uplink and downlink. For example, LTE utilizes orthogonal frequency division multiplexing (OFDM) on the downlink and single-carrier frequency division multiplexing (SC-FDM) on the uplink. The wireless communication system 300 may provide wireless service over a large geographic region. For example, access points 302A-302G may be configured as macro cells covering a few blocks in a neighborhood, or larger areas. Lower-power access points such as access points 308A-308C may provide wireless service over a relatively small area, for example a portion of an office building, airport, office complex, or other service area that may be contained in one or more of the cells 302A-302G.

The wireless system 300 may support synchronous or asynchronous operation. For synchronous operation, the access points may have similar frame timing, and transmissions from different access points may be approximately aligned in time. For asynchronous operation, the access points may have different frame timing, and transmissions from different access points may not be aligned in time. The techniques described herein may be used for both synchronous and asynchronous operation.

Power Control for Energy Management, Problems and Solutions

In one aspect, the present disclosure describes approaches for communicating inter-RAT messages and related aspects across a wireless network to facilitate greater efficiency in operations related to network energy savings. For example, the present disclosure discloses ideas to improve signaling efficiency in Radio Access Network (RAN) Information Management (RIM) based applications. In another aspect, improvements for inter-RAT network energy savings may be used for other applications, for example, in a Self Organizing Network (SON). One skilled in the art would understand that although the SON application is illustrated herein as an example, other applications may be applicable without affecting the spirit or scope of the present disclosure.

In one example, some inter-RAT messages, for example load information, may be carried using the 3GPP standardized RAN Information Management (RIM) mechanism. Since inter-RAT energy savings scenarios are being investigated in the 3GPP community, messages that facilitate energy savings applications may need to be transmitted between inter-RAT network nodes. The present disclosure identifies some of the information and discloses techniques to communicate those messages. In addition, the present disclosure provides enhancements for improving signaling efficiencies when RIM or similar signaling is used in inter-RAT scenarios.

In one aspect, information for sharing between RATs for energy savings may include, for example, load information, system information (SI) and cell activation/deactivation notifications, requests and responses. In one example, the cell activation/deactivation messages may be communicated by using one or more of the following approaches. Such messages may be communicated by extending the SON Transfer application to include a "notification container." In the alternative, messages may be communicated by defining a network energy savings "RIM Application Identity" and a corresponding "Cell Power State Application" to carry the cell activation and deactivation notifications, requests and response messages. A further alternative may include creating a new SON transfer application, the SI Application for supporting SI reporting.

In addition, the present document discloses three enhancements for improving the signaling efficiencies when RIM signaling is used in inter-RAT scenarios. These enhancements may include, for example, combination of messages, broadcast of RIM messages, or pre-configuration of System Information/Load reporting.

In one example, a RIM approach may be used for message exchanging across RATs. Among other things, the present disclosure provides details for a RIM-based Inter-RAT signaling approach for energy savings.

In one aspect, there are a number of messages that may need to be communicated between cells of the EUTRAN and UMTS terrestrial radio access network/GSM EDGE radio access network (UTRAN/GERAN) for network energy saving purposes. These messages may include:

1. ON/OFF Messages
   Notifications: from the eNB to the neighboring cells, notifying them that the power status of the eNB has changed.
   Request/Response: the ON/OFF request may be sent from neighboring cells to request the eNB to power on/off. The requested eNB may reply with the response to ACK/NACK the request message.
2. RAN information may include information exchanged between the inter-RAT nodes for deciding when a EUTRAN cell should be powered on or off. RAN information may include, for example, load information for a cell. In addition, system information may also be exchanged between the RAN nodes to be used in migrating idle UEs from one network node to another.

In another aspect, a RIM procedure that provides a generic mechanism for the exchange of arbitrary information between applications belonging to the RAN nodes may be used for providing the above information between cells of one or more wireless communications networks. In one example, the RAN information may be transferred in RIM containers from a source RAN node to a destination RAN node by use of messages. The RAN information when carried in RIM containers is transparent to core network nodes. This feature implies that the network nodes are not impacted by the definition of new RIM applications. Instead, changes would only be required to the source and destination RAN nodes. Currently, for self organizing network (SON) applications, i.e. SON transfer RIM applications, information such as cell load may be shared between network nodes of different RANs using the RIM procedure. In one example, a similar approach may be used for load information sharing and neighbor notification between the E-UTRAN cell and the UTRAN/GERAN cell for energy savings purposes as discussed below.

In one example, two different approaches may be used to implement ON/OFF (i.e. cell activation/deactivation) notification, request or response messages between cells. One of these approaches may require a modification of the SON Transfer Application, while the other approach may require the creation of a new "RIM Application identity." Both approaches are described in more detail below.

Approach 1: In one aspect, if the SON Transfer Application is used, a new SON TRANSFER application named "Cell Power State Application" may be defined to support Cell activation/deactivation notification, request and response. FIG. 4 illustrates an example protocol stack 400 for a Cell Power State Application 402 with a modified SON Transfer Application 404. However, since the SON Transfer Application 404 does not support notification messages (i.e. it does not have a notification container), the SON Transfer Application 404 may need to be extended to support the notification messages by adding a "SON Transfer Notification Container." With these changes, the Cell Activation/Deactivation Notification, Request and Response may be implemented using the SON Transfer Notification Container, the SON Transfer Request Container and the SON Transfer Response Container, respectively.

Lower levels of the protocol stack may include RIM 406 as discussed above and one or more of a S1AP, RANAP, or BSSGP layer 408. "S1AP" means the S1 application protocol, used for EUTRAN signaling procedures between the eNB and core network entity, the Mobility Management Entity (MME). "RANAP" means Radio Access Network Application part, used for signaling between the UTRAN and core network elements like the Serving General Packet Radio Service (GPRS) Support Node (SGSN) and Mobile Switching center (MSC). "BSSGP" means Base Station System GPRS Protocol for the GSM EDGE Radio Access Network (GERAN), the signaling protocol used for signaling between the BSS and the core network entity Serving GPRS Support Node (SGSN). RIM carries messages in containers and ensures that when message are communicated between the RANs (e.g. the UTRAN and EUTRAN), the core network entities (e.g. MME, SGSN, MSC) forward those messages to the appropriate RAN without decoding or modifying those messages. Hence, the RIM procedure runs on top of the S1AP/RANAP/BSSGP layer 408.

Approach 2: In another aspect, instead of modifying the existing SON Transfer Application, a new RIM Application identity named "Network Energy Savings Application" can be created. FIG. 5 illustrates an example protocol stack 500 for a Cell Power State Application 502 with a Network Energy Savings Application (NESA) layer 504. A NESA layer 504 may be defined similarly to the existing SON Transfer Application layers to similarly include request and response containers. In addition, a "Notification Container" may also be included in the NESA layer 504. The Cell Power State Application may then be defined as a NESA identity to support cell activation/deactivation notification, request and response messages. Lower levels of the protocol stack may include RIM 506 as discussed above and one or more of a S1AP, RANAP, or BSSGP layer 508.

FIG. 6 illustrates an example of a call flow 600 between nodes performing cell power state notification for either approach outlined above. A first node 602 and second node 604 may be any two respective base stations (cells) collectively using more than one RAT, i.e., using different RATs. The first node 602 may transmit 606 a "Cell Power State Notification" message to the second node 604 when the first node wants to notify the second node that its power status has changed either to powered up ("On") using an activation indicator message, or to powered down ("Off") using a deactivation indicator. Transitioning to a powered down state may not entail powering every component of the first cell (e.g., first node 602) entirely off, although its dedicated mobile service components may be generally powered off. In general, wireless services provided by the first node to one or more mobile entities may be provided by the second node 604 or another cell while the first node 602 is in a powered down state. It should be appreciated that the first node may consume less power when in a powered down state, and one benefit from transitioning between powered up and powered down states may be to provide a more efficient use of power system-wide.

Figure 7:
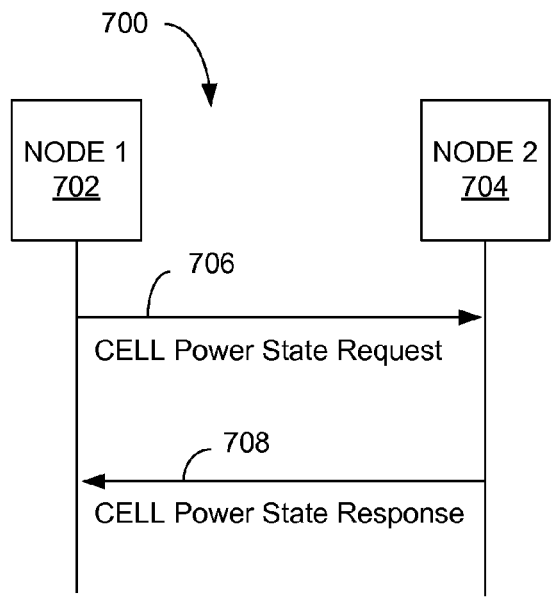
FIG. 7 illustrates an example of cell power state request and response messages.

FIG. 7 illustrates a similar example of a call flow 700 between nodes performing cell power state request and response messages for either approach outlined above. A first node 702 (e.g., an inter-RAT RAN node) may seek to power-on a second E-UTRAN node 704, for example to off load certain mobile entities to node 704 to free up capacity on node 702, in response to exceeding a load threshold. Under such conditions, the node 702 may transmit 706 a "Cell Power State Request" message with an "activation indicator" to the node 704 currently in a powered down state. The node 704 may respond by transmitting 708 a "Cell Power State Response" message carrying an acknowledgement (ACK) or non-acknowledgement (NAK) to the request message 706.

In an aspect, the following information may be included in the messages 606, 706, and 708:
  Cell Power State Notification 606 may include a Source cell ID, Activation/Deactivation Indicator and Reason for state change.
  Cell Power State Request 706 may include a Source cell ID, Activation/Deactivation Indicator and Reason for Request.
  Cell Power State Response 708 may include a Source cell ID and Response (ACK/NAK).

In another aspect, to avoid backward compatibility issues with existing handsets that support the SON Transfer Application, a new "RIM Application Identity" (i.e. the Network Energy Savings Application (NESA)) may be defined, as outlined above under "Approach 2." The NESA may be similar to the SON Transfer Application, with the addition of a notification container for power state information. A new "Network Energy Savings Application identity" such as the "Cell Power State" Application, may be defined to carry the notification, response and request messages.

Cell Load Reporting: In UMTS Release 9, the "Cell Load Reporting" application that supports requesting and reporting a load report wherein eNodeB cells exchange RAN information with their inter-RAT neighbors to determine whether or not to switch off and transition to a powered down state. In that case, the determination for each cell may be based on a combination of information about its own load and neighboring inter-RAT and inter-eNB cells load information received in response to a cell load reporting request. Note that only a single report per cell may be received in response to a cell load reporting request.

To reduce signaling overhead and increase the reporting efficiency, a multi-cell load reporting application may be used for inter-RAT load reporting, whereby a central node (for example, a Radio Network Controller (RNC)) may collect load information for several cells (e.g. UTRAN cells) and report all of them together to a requesting node. A scenario where an aggregate load reporting application may be useful may include an inter-RAT overlaid scenario, wherein an underlay RNC collects load from multiple UTRAN cells and report them to the E-UTRAN cell that is about to make a decision to power up or down (on or off). Moreover, in case multiple cells under one RNC are requested to report their load to the same E-UTRAN cell, which may be a likely occurrence in the inter-RAT energy savings overlaid scenario, providing the information simultaneously in a single message is beneficial since this allows the E-UTRAN to make its decision in a timely fashion and based on full information.

Figure 8A:
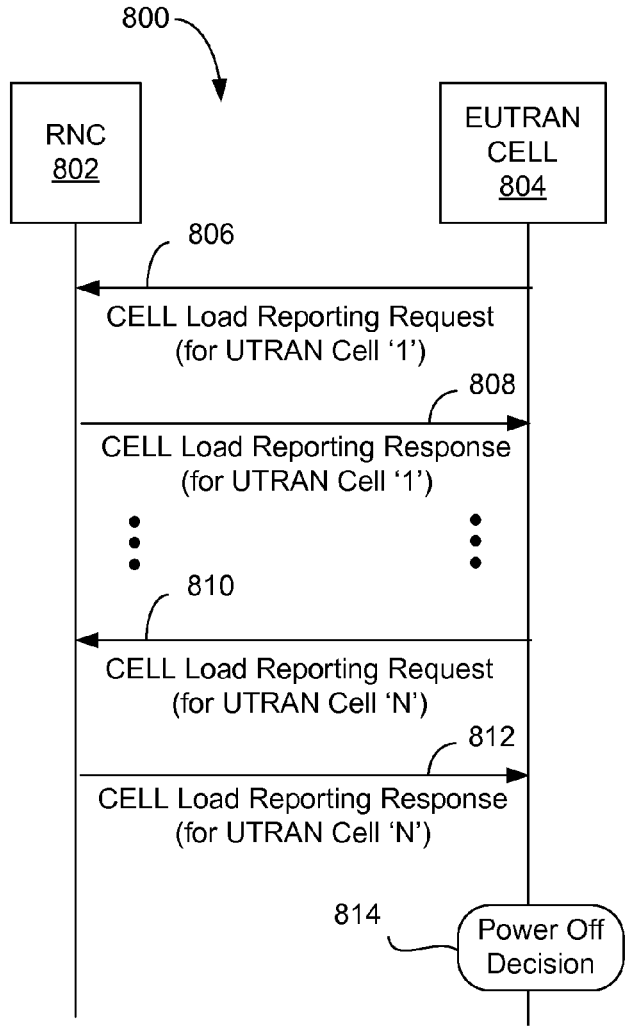
FIGS. 8A-8B illustrates examples of an inter-RAT signaling with single cell reporting and multicell reporting, respectively.

In another aspect, since one RNC is reporting the load for multiple cells the signaling overhead may be reduced at the same time. FIG. 8A illustrates an example of an inter-RAT signaling call flow 800 with a single cell report between an RNC 802 and a E-UTRAN cell 804. Using single cell reports, cell 804 requests cell load reporting 806 for a particular cell and the RNC 802 provides a cell load reporting response 808 for the cell identified by the request 806. The cell 804 may generate 'N' number of request up to the 'Nth' request 810 to which the RNC 802 may respond with a corresponding load report 812. The E-UTRAN may then determine 814 whether or not to power itself off based on the 'N' load reports received. Note that '2N' messages are required if the single cell reporting is used for reporting the load for 'N' cells, namely a request and response for each cell of interest.

Figure 8B:
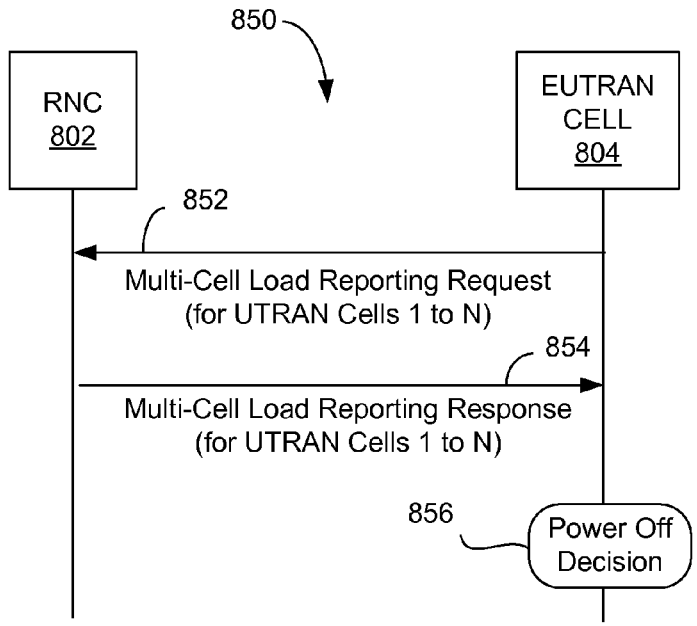

Accordingly, multi-cell reporting 850 may be useful for E-UTRAN Inter-RAT energy saving scenarios, as shown in FIG. 8B. The E-UTRAN cell 804 may transmit 852 a multi-cell load reporting request that includes information identifying all cells for which load reports are desired. The RNC 802 may respond with a single multi-cell reporting response 854, including the load information for all requested cells. The E-UTRAN may then determine 8856 whether or not to power itself off based on the load reports received for 'N' number of cell neighbors. Thus, as few as 2 messages may be required for the E-UTRAN cell 804 to obtain all load information required for a power transition determination, using multi-cell reporting. Signaling savings may on the order of N, where N is the number of neighboring inter-RAT cells, typically more than 1. Both single cell and multi-cell load reporting may be supported by the RNC and cell for energy savings cell load reporting.

In another aspect, event triggering of load reporting may also be provided for power management across multiple wireless cells. Event triggering may involve the ability to trigger load information reporting based on triggers such as a load threshold. Event triggered load reporting may be useful in scenarios where the power off decision is made based on load exchanging. An example of such scenario may be when an EUTRAN receives a event-triggered load report from one or more neighboring cells (e.g. inter-RAT cells) stating that their load is under a certain threshold (i.e. "low"). Based on the load information, the receiving EUTRAN may be triggered to measure it own load and if found to be in a "low" load scenario, such E-UTRAN may decide to power itself down without incurring additional delay and signaling overhead of requesting a new cell load information from the neighboring RATs. As an additional benefit, event triggering functionality may make the E-UTRAN more responsive to varying traffic load on the network.

In another aspect, an additional scenario of interest for energy saving is the possibility for a cell to power off at certain time of the day. To facilitate a correct decision, a E-UTRAN cell may estimate its load periodically, for example, on an hourly basis. The E-UTRAN cell may request neighboring cells to report their load also with the same periodicity at synchronized times, so that synchronized information automatically available throughout the system for power state transition (power up or power down) determinations. This feature may be achieved by periodic reporting using an additional reporting mechanism, as well as by event-triggered reporting with time-based triggers. For example, synchronized reporting may be configured via an Operations and Maintenance (O&M) procedure on several cells in the same area.

Figure 9A:
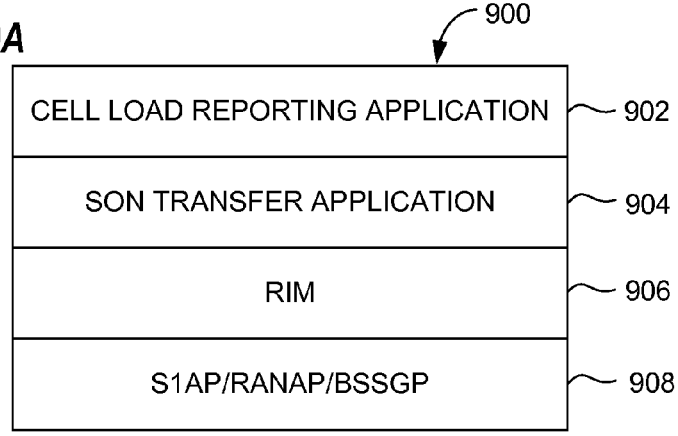
FIG. 9A illustrate an examples of a 3GPP Release 9 protocol stack for a cell load reporting application.

FIG. 9A illustrates an example of a 3GPP Release 9 protocol stack 900 including a Cell Load Reporting Application layer 902 coupled to a SON Transfer application layer 904. Lower levels of the protocol stack may include RIM 906 as discussed above and one or more of a S1AP, RANAP, or BSSGP layer 908.

Figure 9B:
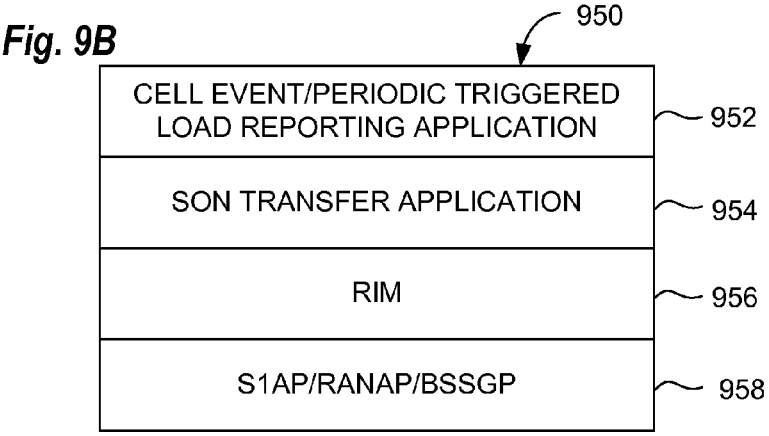
FIG. 9B illustrates an example of a protocol stack for a multi-cell and event-triggered reporting enhancement.

FIG. 9B illustrates an example of an alternative protocol stack 950 for providing enhancements for multi-cell and event-triggered reporting. The stack 950 may include a top layer event or periodic triggered load reporting application 952, including features as summarized above. The triggered load reporting application 952 may be coupled to a SON Transfer application layer 954. Lower levels of the protocol stack may include RIM 956 as discussed above and one or more of a S1AP, RANAP, or BSSGP layer.

Figure 10:
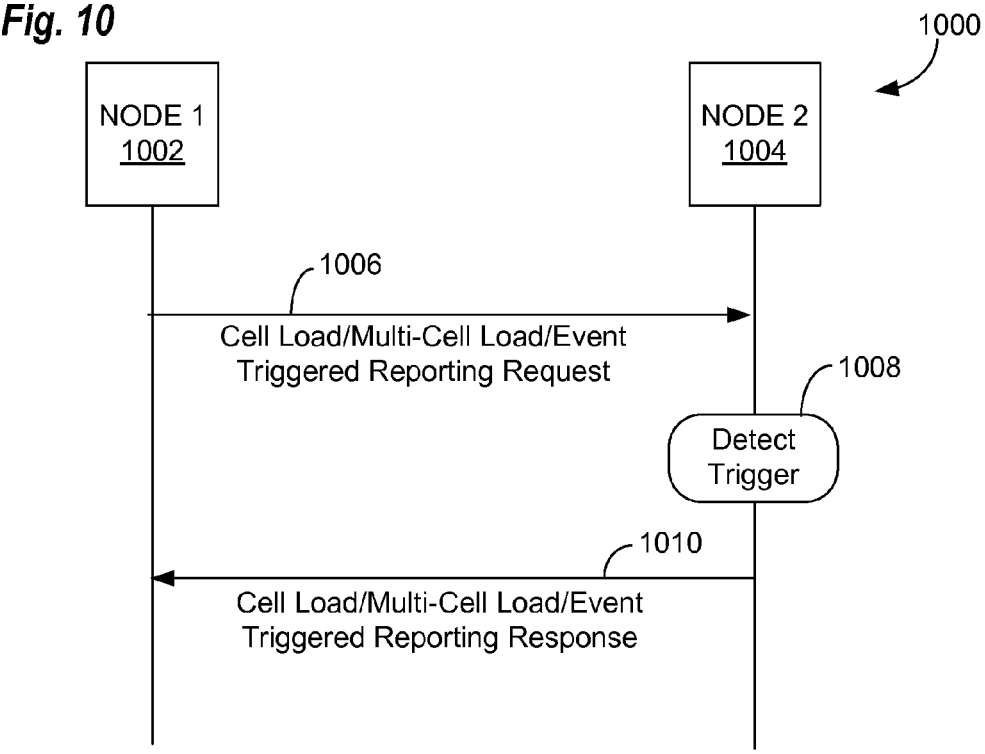
FIG. 10 illustrates an example of a cell/multi-cell/event triggered load report request and response messages.

FIG. 10 illustrates an example of a cell/multi-cell/event triggered load report request and response messages call flow 1000, corresponding to the protocol stack 950 shown in FIG. 9B. A first node 1002 may then transmit 1006 an event-triggered or periodic reporting request to a second node 1004. The second node may receive the request and activate a trigger-detection process 1008. In response to detecting 1008 a trigger event or trigger period, the second node 1004 may provide a triggered load reporting response 1010 to the first node 1002.

System Information (SI) reporting may be configured in a manner similar to load reporting. In one example, SI reporting may be used for migrating UEs or other access terminal between inter-RAT cells when an E-UTRAN cell undergoes a power transition. Desirable SI reporting functions may include, for example:
    single SI reporting, wherein the requesting node polls for a
        single SI report from a reporting node;
    multi-cell SI reporting, wherein SI reports for multiple
        cells are reported in one single message; and
    event triggered SI reporting, where the SI reports are sent to
        a requesting node due to SI changes or updates at the
        reporting node.

An example of multi-cell SI reporting may include an E-UTRAN cell undergoing a power transition, requesting SI from several UTRAN cells. An RNC may collect the SI from multiple UTRAN cells and forward the collected SI to the E-UTRAN.

Figure 11:
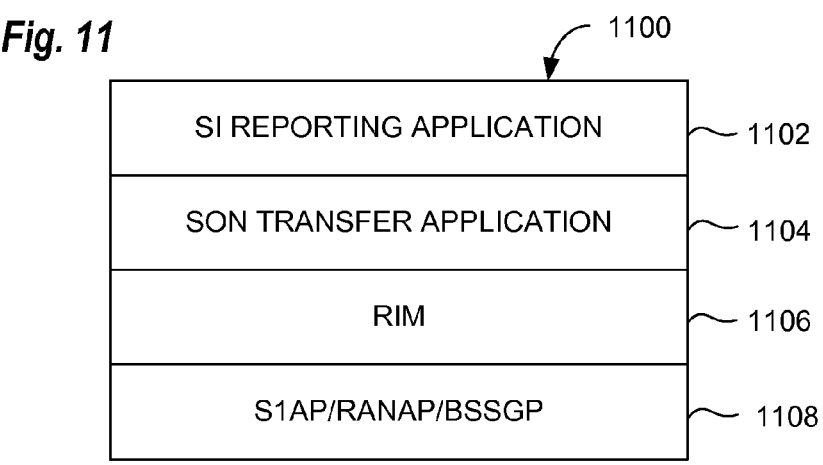
FIG. 11 illustrates an example of a protocol stack for System Information (SI) reporting.

These SI reporting functionalities may be achieved by reusing the cell load, multi-cell load and event triggered SON Transfer applications while adding an information element (IE) to the response and request messages for the SI information. Alternatively, a new SI Reporting Application 1102 using the SON Transfer Application 1104 may be created, as depicted in FIG. 11 showing a protocol stack 1100. The protocol stack 1100 may be used to provide options of single reports, multi-cell reports or event triggered reports. The SON Transfer application layer 1104 may be coupled to lower levels of the protocol stack 1100 including RIM 1106 as discussed above and one or more of a S1AP, RANAP, or BSSGP layer 1108.

In order to avoid backward compatibility issues for UEs already supporting a legacy cell load reporting application, the new SI Reporting Application 1102 may be preferred. In addition, this SI reporting Application can be also used for other applications such as SON, Circuit Switching Fallback (CSFB), and so forth. An essential characteristic of the new SI Reporting Application 1102 may include support for single cell, multi-cell and event-triggered SI reporting.

In another aspect, to increase the reporting efficiency of the mechanisms discussed in the previous sections, additional functionalities may be provided for efficiency enhancement. For example, inter-RAT messages may be combined to reduce signaling overhead. For example, a signaling node (e.g. eNB) may attach SI to an "on" notification (e.g., Cell Activation Notification) sent to the neighbor cells. This SI may be used to update the neighboring cells' system information blocks (SIBs) so as to migrate idle access terminals from the neighboring cells to the E-UTRAN. Similarly, a cell load request may be piggy backed on the "on" notification (e.g., Cell Activation Notification) sent to neighboring cells when a E-UTRAN cell powers back on. Load information, SI and "on/off" notifications, requests or responses may be combined in any useful combination. In particular, load information may be combined with any one or both of system information and a power transition notification, request or response. Similarly, system information may be combined with any one or both of load information and a power transition notification, request or response.

For further example of efficiency enhancements, broadcast messages may be used for power transition request, notification or reporting. The ability to broadcast information sent to multiple neighboring cells instead of sending each of the cells individual messages may significantly reduce the messaging on the network. For example, by broadcasting an "on" notification (e.g., Cell Activation Notification) or other power transition message, an eNB may avoid saves sending multiple unicast messages through the network, one for each neighboring cell to be notified. Instead, all neighbors may be notified using a single broadcast.

In addition, efficiency enhancement may also be provided by using pre-configured system information or load reporting. Since the reporting configuration required when a cell (e.g., eNodeB) is in a power ON state may be different from what is required in the power OFF state, signaling overhead may be reduced by setting up a reporting configuration for the power ON and OFF states, to be used by the cell's neighbors over an extended period of time persisting over multiple power transition cycles. The reporting neighbor node then switches between both configurations based on the reception of the power transition messages.

FIG. 12 illustrates an example of call flow 1200 for regular system information or load reporting between a first node 1202 undergoing power transitions and one or more reporting nodes, e.g., reporting node 1204, in which efficiency is not enhanced by pre-configuring reporting. The first node 1206 undergoes a power-on transition at 1206, and notifies using message 1208 the reporting node 1204 of an SI/load reporting configuration to use while node 1202 is powered up and serving wireless access terminals. Subsequently, the reporting node 1204 may provide a report 1210 according to the requested configuration. Later (for example in response to a load report) the first node 1202 may decide to power down, and prepares for a power down transition by sending a message 1212 to the reporting node 1202 deactivating the first reporting configuration, followed by a second message 1214 activating a second SI/load reporting configuration. Then the first node 1202 transmits 1216 a "power off" notification to the reporting node 1204, and powers down 1218 to an "off" state in which it can still communicate with the reporting node 1204, but does not provide wireless service for access terminals. While in the "off" state, the reporting node provides a load report 1220 according to the requested second reporting configuration for the power-off state. Later (for example in response to the load report) the first node 1202 may decide to power up, and prepares for a power up transition by sending a message 1222 to the reporting node 1202 deactivating the second reporting configuration, followed by a second message 1224 activating the first SI/load reporting configuration for a powered-up state and still further by a "on" notification message 1226. The first node 1202 may then power up 1228 and receive the load report from the reporting node 1204 according to the requested first SI/load reporting configuration.

In comparison, FIG. 13 illustrates an example of call flow 1300 for regular system information or load reporting between a first node 1302 undergoing power transitions and one or more reporting nodes, e.g., reporting node 1304, in which efficiency is enhanced by pre-configuring reporting. The first node 1302 undergoes a power-on transition at 1306, and notifies using the message 1308 the reporting node 1304 of an SI/load reporting configurations to use while node 1302 is powered up and serving wireless access terminals, or powered down and not serving access terminals, over persistent cycles of powering up or down. Subsequently, the reporting node 1304 may provide a report 1310 according to the requested configuration for the powered up state, because it has been notified that the first node 1302 is powered up, and assumes that it remains powered up until notified otherwise. The first node 1302 may process the report according to the pre-configured first configuration, to obtain the transmitted SI and load information contained in the report.

Later (for example in response to the load report or multiple reports) the first node 1302 may decide to power down, and prepares for a power down transition by transmitting 1312 a "power off" notification to the reporting node 1304. The first node 1302 then powers down 1314 to an "off" state in which it can still communicate with the reporting node 1304, but does not provide wireless service for access terminals. While in the "off" state, the reporting node provides a load report 1316 according to the requested second reporting configuration for the power-off state. The first node 1302 may process the report according to the pre-configured second configuration while in the powered down state, to obtain the transmitted SI and load information contained in the report.

At some later time (for example in response to further load information) the first node 1302 may decide to power up, and provide a "power on" notification 1318 to the reporting node 1304. The first node 1302 may then power up 1320 and receive subsequent load reports from the reporting node 1304 according to the requested first SI/load reporting configuration for the power-on state. As is apparent from comparing FIG. 13 to FIG. 12, signaling load may be reduced if the reporting node switches to the pre-configured reporting preference upon receiving ON/OFF notifications, as some of the messages sent to stop (deactivation) or start (activation) the SI or load reporting are eliminated.

To overcome these and other problems associated with signaling related to network energy savings in wireless communications systems for energy management and to provide the various enhancements described above, new methodologies and apparatus as described below may be adapted for use with existing and future wireless communications protocols. Such methodologies and apparatus should provide technical effects including, but not necessarily limited to, reducing or eliminating problems and providing enhancements such as summarized above.

Example Methodologies and Apparatus

In view of exemplary systems shown and described herein, methodologies that may be implemented in accordance with the disclosed subject matter, will be better appreciated with reference to various flow charts. For purposes of simplicity of explanation, methodologies are shown and described as a series of acts/blocks, but the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

A network entity may perform a method 1400 for controlling reporting configurations for cells of one or more wireless communications networks based on current power state of a cell, as shown in FIG. 14. The access point may be, or may include, a base station of any of the various forms described herein. The base station or cells may include cell infrastructure belonging to separate operators, or may include cell infrastructure shared by two or more operators, or may be owned and controlled entirely by a single operator. The method may include, at 1402, providing reporting configuration instructions to one or more second cells, instructing the one or more second cells to select one of at least two defined configurations for reporting at least one of system information or load information to a first cell, based on whether the first cell is in a powered up state or a powered down state. For example, the first cell may provide the predefined reporting configuration to the second cells. In the alternative, the predefined reporting configurations may be defined by a centralized network entity (e.g. the core network) and provided to multiple cells for general use. In such cases, the report configuration instructions from the first cell may simply indicate that a predefined reporting scheme with two or more report configurations should be adopted for SI or load reports to be provided to the first cell. The reporting configuration instructions may be stored in a memory of the reporting cell, and persist in the reporting cell's memory for multiple power cycles of the first cell, until replaced or superseded by alternative or updated instructions. An appropriate or optimal reporting configuration for the second cell while the first cell is in the powered up state should be different from when the first cell in a powered down state. Using the same reporting configuration for reports from the second cell to the first cell regardless of the state of the first cell may cause inefficiency in system operation.

The method 1400 may further include, 1404, transmitting notifications from the first cell to the one or more second cells indicating when the first cell is transitioning to a current power state selected from the powered up state and the powered down state. These notifications may, after being received by the reporting cell, operate as a trigger to cause the reporting node to adopt a different report configuration for the first cell, based on the power state of the first cell, whenever SI or load reporting is triggered by an event-based or periodic trigger.

The method 1400 may further include, at 1406, selecting one of the at least two defined configurations for interpreting data received from the second cell, based on the current power state, to obtain at least one of the system information or the load information. For example, the first cell may receive a message from the second cell in which certain predefined system or load information data fields are keyed to particular locations within the message. Thus, by applying an implied report configuration including pertinent location keys to interpret message data fields, a processor may efficiently identify parameter values for load and system information as reported by the second cell. Accordingly, the first and second cell may avoid the need to define system information or load reporting configuration every time the first cell transitions its power state, or when the system and load information is provided.

FIGS. 15-19 show further optional operations or aspects 1500, 1600, 1700, 1800 and 1900 that may be performed by an access point in conjunction with the method 1400, or in some cases independently of said method. The operations shown in FIGS. 15-19 are not required to perform the method 1400. The operations are independently performed and not mutually exclusive. Therefore any one of such operations may be performed regardless of whether another downstream or independent upstream operation is performed. If the method 1400 includes at least one operation of FIGS. 15-19, then the method 1400 may terminate after the at least one operation, without necessarily having to include any subsequent downstream operation(s) that may be illustrated. In addition, certain elements of the additional operations, such as the additional operations 1600, 1700 or 1800 may be implemented independently of the method 1400 as well as in conjunction with it.

Figure 15:
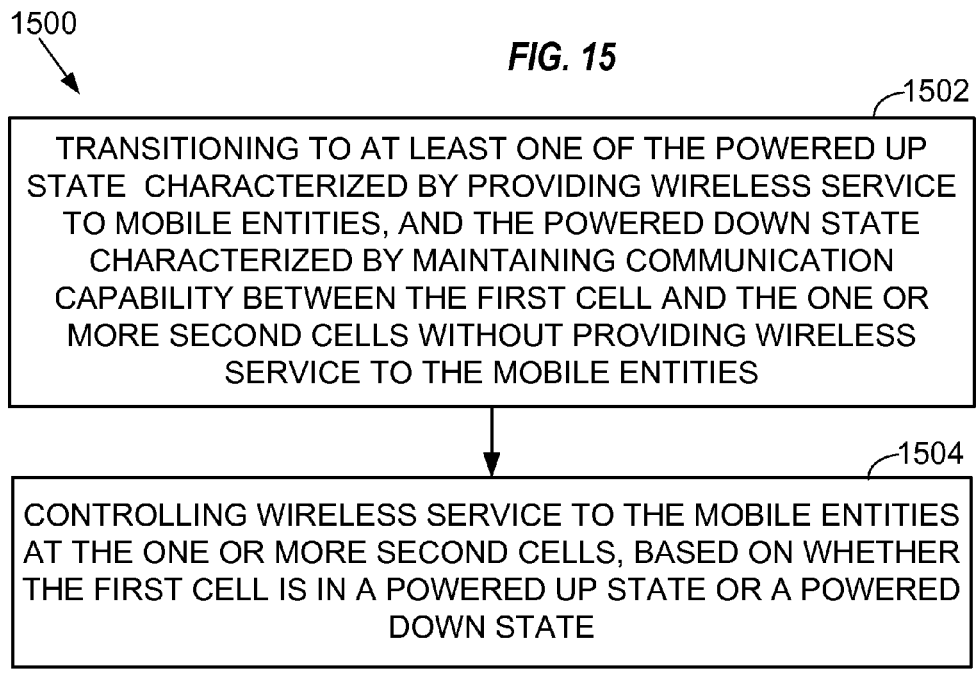

Referring to FIG. 15, method 1400 may include one or more of the additional operations 1500. In an aspect, the method 1400 may further include, at 1502, the first cell transitioning to at least one of the powered up state characterized by providing wireless service to mobile entities, and the powered down state characterized by maintaining communication capability between the first cell and the one or more second cells without providing wireless service to the mobile entities. The powered up state may sometimes be referred to herein as "power on," and the powered down state as "power off." Transitioning to a powered down state may not entail powering every component of the first cell entirely off, although mobile service components of the first cell may be generally powered off. In a related aspect, the method 1400 may further include, at 1504, controlling wireless service to the mobile entities at the one or more second cells, based on whether the first cell is in a powered up state or a powered down state. In general, wireless services provided by the first cell to one or more mobile entities may be provided by the second cell while the first cell is in a powered down state. It should be appreciated that the first cell may consume less power when in a powered down state, and one benefit from transitioning between powered up and powered down states may be to provide a more efficient use of power system-wide.

Figure 16:
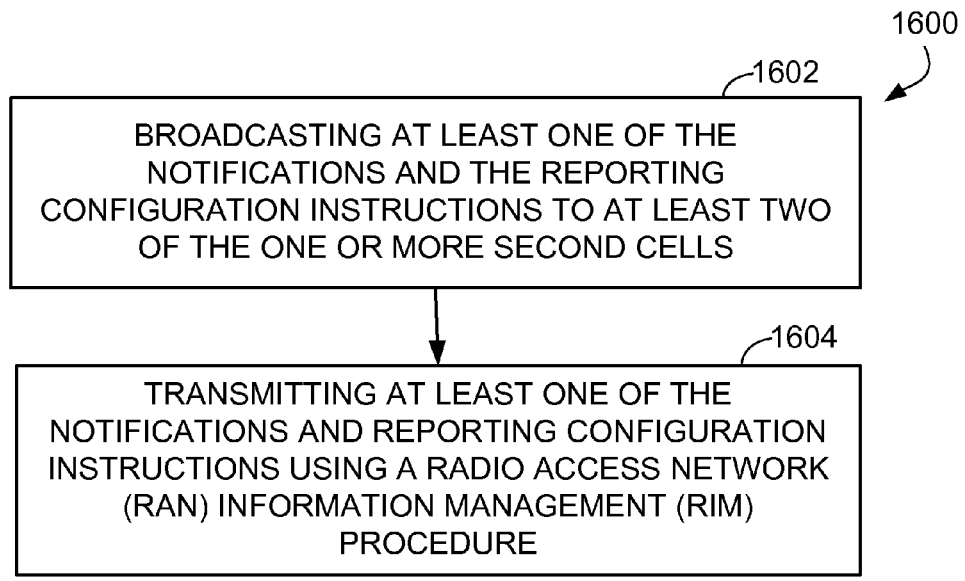

Referring to FIG. 16, method 1400 may include one or more of the additional operations 1600. In the alternative, one or more of the operations 1600 may be performed as separate method. In an aspect, the method 1400 may further include, at 1602, the first cell broadcasting at least one of the notifications and the reporting configuration instructions to at least two of the one or more second cells. More than one of the second cells may receive the instructions from the same broadcast signal, and may configure subsequent reports accordingly. To perform the broadcast of reporting configuration, the first cell or other network entity may use any suitable method for broadcasting available in the application RAT. For example, the method 1400 may include, at 1604, transmitting at least one of the notifications and reporting configuration instructions using a Radio Access Network (RAN) Information Management (RIM) procedure. In addition, as noted above, the SI and load information notifications, requests, and reports may also be communicated between inter-RAT cells using RIM procedures.

Referring to FIG. 17, method 1400 may include one or more of the additional operations 1700. In the alternative, one or more of the operations 1700 may be performed as separate method. In an aspect, the method 1400 may further include, at 1702, the first one of the cells providing wireless service using a first radio access technology (RAT), and the one or more second cells providing wireless service using a second RAT different from the first RAT. In such embodiments, the method 1400 or an independent method may include, at 1704, transmitting at least one of the notifications and the reporting configuration instructions using an inter-RAT procedure.

In a related aspect, the method 1400 or an independent method may include, at 1706, formatting at least one of the notifications and the reporting configuration instructions for one or more self-organizing nodes (SONs) or cells. A self-organizing node may include an operating system that supports automatic configuration and integration of the cell into a network of base station. Self organizing may therefore include connectivity establishment, and download of configuration parameters and software. To format a notification or configuration instructions for a self-organizing node means that this information is provided in a message format that will be recognizable and useable to a node that include self-organizing capability. Format details may vary based on applicable RAT or standard. However, effective network energy savings per cell is expected to be an important requirement for self-organizing networks, which may include substantial overlaps in cell coverage. Accordingly, operability of the notifications and report configuration instructions with self-organizing nodes may be an important operational feature.

In another aspect, the method 1400 or an independent method may include, at 1708, transmitting a cell identifier to the one or more second cells, in association with at least one of the notifications and the reporting configuration instructions. In addition, the method 1400 or an independent method may include transmitting an indication of a reason for initiating the current power state to the one or more second cells, in association with each of the notifications. The indication of a reason for a power state change may be used by the second cells for managing loads and reporting configurations.

Referring to FIG. 18, method 1400 or an independent method may include one or more of the additional operations 1800. In an aspect, the method 1400 or an independent method may include, at 1802, combining at least one of the notifications in a message with at least one of cell load information and system information for the first cell. For example, when the first cell is in a powered up state, it may include a "powering down" notification with a cell load report or SI report. In addition, the method 1400 or an independent method may further include, at 1804, migrating idle ones of the mobile entities from one of the first cell and second cells to another of the first cell and second cells, based on the system information. For example, the first cell may migrate an idle mobile entity to one or more of the second cells. Conversely, one or more of the second cells may migrate an idle mobile entity to the first cell.

Referring to FIG. 19, method 1400 may include one or more of the additional operations 1900. In an aspect, the method 1400 may further include, at 1902, selecting the one of at least two reporting configurations at the one or more second cells, based on receiving each of the notifications from the first cell. For example, the second cell may select a powered down configuration for a report to the first cell, at times when the latest report from the first cell indicates that the first cell is in a powered down state. Accordingly, the method 1400 may further include, at 1904, determining which system information is reported by the one or more second cells to the first cell, based on a selected one of the at least two configurations. In other words, the method may include the second cell following the reporting configuration instructions from the first cell based on its reported current power state. Such operations by the second cell may enable the first cell to correctly process data received from the second cell, based on its current power state, to obtain the system information or the load information.

Figure 20:
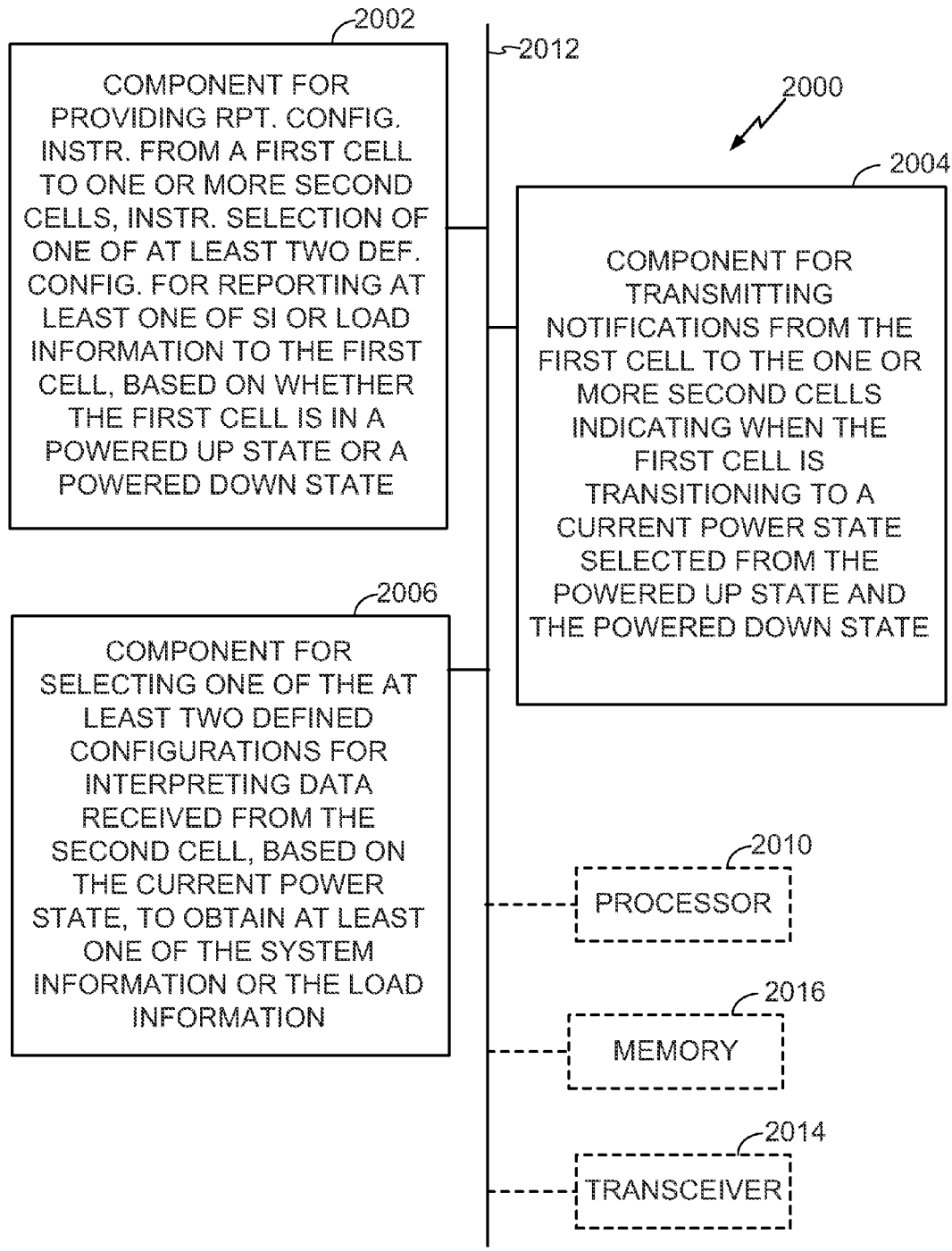
FIG. 20 is a block diagram illustrating an embodiment of an apparatus for controlling reporting configurations for cells of one or more wireless communications networks based on current power state of a cell, in accordance with the methodologies of FIGS. 14-19.

With reference to FIG. 20, there is provided an exemplary apparatus 2000 that may be configured as an access point in a wireless network, or as a processor or similar device for use within the access point, for controlling reporting configurations for cells of one or more wireless communications networks based on current power state of a cell. The apparatus 2000 may include functional blocks that can represent functions implemented by a processor, software, or combination thereof (e.g., firmware).

In one embodiment, the apparatus 2000 may include an electrical component or module 2002 for providing reporting configuration instructions to one or more second cells, instructing the one or more second cells to select one of at least two defined configurations for reporting at least one of system information or load information to a first cell, based on whether the first cell is in a powered up state or a powered down state. For example, the electrical component 2002 may include at least one control processor coupled to a transceiver or the like and to a memory with instructions for generating and transmitting a message indicating two or more predefined reporting configurations to be used for reporting system information or load information. The indicating may be done by reference to standard configurations already in memory at the one or more second cells. The electrical component 2002 may be, or may include, a means for instructing the one or more second cells to select one of at least two defined configurations for reporting at least one of system information or load information to the first cell, based on whether the first cell is in a powered up state or a powered down state. Said means may be or may include the at least one control processor operating an algorithm. The algorithm may operate in an application to generate and transmit an explicit or implicit indication of defined reporting configurations related to respective ones of the powered up and powered down states.

The apparatus 2000 may include an electrical component 2004 for transmitting notifications from the first cell to the one or more second cells indicating when the first cell is transitioning to a current power state selected from the powered up state and the powered down state. For example, the electrical component 2004 may include at least one control processor coupled to a memory holding instructions for transmitting the notifications whenever a change in power state is imminent. The electrical component 2004 may be, or may include, a means for transmitting notifications from the first cell to the one or more second cells indicating when the first cell is transitioning to a current power state selected from the powered up state and the powered down state. Said means may be or may include the at least one control processor operating an algorithm. The algorithm may operate in an application memory to detect when a transitions to a different power state is imminent at the first cell, and to provide a notification of the change in power state immediately before, during, and/or immediately after a power state transition, using a wireless or wired transmission to at least one of the second cells.

The apparatus 2000 may include an electrical component 2006 for selecting one of the at least two defined configurations for interpreting data received from the second cell, based on the current power state, to obtain at least one of the system information or the load information. For example, the electrical component 2006 may include at least one control processor coupled to a memory holding instructions for processing digital data from a message to detect data field for SI or load parameters, and to provide parameters to a memory for an application layer controlling cell operations. The electrical component 2006 may be, or may include, a means for interpreting data received from the second cell, based on the current power state, to obtain at least one of the system information or the load information. Said means may be or may include the at least one control processor operating an algorithm. The algorithm may operate in an application memory to recognize specific data records in a received message using predefined data field locations, a data map, or data field labels included in the message. The apparatus 2000 may include similar electrical components for performing any or all of the additional operations 1500, 1600, 1700, 1800 or 1900 described in connection with FIGS. 15-19, which for illustrative simplicity are not shown in FIG. 20.

In related aspects, the apparatus 2000 may optionally include a processor component 2010 having at least one processor, in the case of the apparatus 2000 configured as an access point. The processor 2010, in such case, may be in operative communication with the components 2002-2006 or similar components via a bus 2013 or similar communication coupling. The processor 2010 may effect initiation and scheduling of the processes or functions performed by electrical components 2002-2006. The processor 2010 may encompass the components 2002-2006, in whole or in part. In the alternative, the processor 2010 may be separate from the components 2002-2006, which may include one or more separate processors.

In further related aspects, the apparatus 2000 may include a radio transceiver component 2014. A stand alone receiver and/or stand alone transmitter may be used in lieu of or in conjunction with the transceiver 2014. In the alternative, or in addition, the apparatus 2000 may include multiple transceivers or transmitter/receiver pairs, which may be used to transmit and receive on different carriers. The apparatus 2000 may also include, or be coupled to, a backhaul interface for communicating with other femtocells in the network and with any network entity connected to via the backhaul. The apparatus 2000 may include a component for storing information, such as, for example, a memory device/component 2016. The computer readable medium or the memory component 2016 may be operatively coupled to the other components of the apparatus 2000 via the bus 2012 or the like. The memory component 2016 may be adapted to store computer readable instructions and data for performing the activity of the components 2002-2006, and subcomponents thereof, or the processor 2010, or the additional aspects 1500, 1600, 1700, 1800 or 1900, or the methods disclosed herein. The memory component 2016 may retain instructions for executing functions associated with the components 2002-2006. While shown as being external to the memory 2016, it is to be understood that the components 2002-2006 can exist within the memory 2016.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any non-transient tangible medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the novel aspects described herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for controlling reporting configurations for cells of one or more wireless communications networks based on current power state of a cell, the method comprising:
    providing reporting configuration instructions from a network entity to one or more second cells, instructing the one or more second cells to select one of at least two defined configurations for reporting at least one of system information or load information to a first cell, based on whether the first cell is in a powered up state or a powered down state, wherein the at least two defined configurations comprises at least a first reporting configuration for reporting the at least one of system information or load information when the first cell is in the powered up state and a second reporting configuration for reporting the at least one of system information or load information when the first cell is in the powered down state;
    transmitting notifications from the first cell to the one or more second cells indicating when the first cell is transitioning to a current power state selected from the powered up state and the powered down state; and
    selecting one of the at least two defined configurations for interpreting data received from the second cell, based on the current power state, to obtain at least one of the system information or the load information.

2. The method of claim 1, further comprising the first cell transitioning to at least one of the powered up state characterized by providing wireless service to mobile entities, and the powered down state characterized by maintaining communication capability between the first cell and the one or more second cells without providing wireless service to the mobile entities.

3. The method of claim 2, further comprising controlling wireless service to the mobile entities at the one or more second cells, based on whether the first cell is in a powered up state or a powered down state.

4. The method of claim 1, further comprising broadcasting at least one of the notifications and the reporting configuration instructions to at least two of the one or more second cells.

5. The method of claim 1, further comprising transmitting at least one of the notifications and reporting configuration instructions using a Radio Access Network (RAN) Information Management (RIM) procedure.

6. The method of claim 1, wherein the first one of the cells provides wireless service using a first radio access technology (RAT), and one or more second cells provides wireless service using a second RAT different from the first RAT.

7. The method of claim 6, further comprising transmitting at least one of the notifications and the reporting configuration instructions using an inter-RAT procedure.

8. The method of claim 7, further comprising formatting at least one of the notifications and the reporting configuration instructions for one or more self-organizing cells.

9. The method of claim 7, further comprising transmitting a cell identifier to the one or more second cells, in association with at least one of the notifications and the reporting configuration instructions.

10. The method of claim 1, further comprising transmitting an indication of a reason for initiating the current power state to the one or more second cells, in association with each of the notifications.

11. The method of claim 1, further comprising combining at least one of the notifications in a message with at least one of cell load information and system information for the first cell.

12. The method of claim 1, further comprising migrating idle ones of the mobile entities from one of the first cell and second cells to another of the first cell and second cells, based on the system information.

13. The method of claim 1, further comprising selecting the one of at least two configurations at the one or more second cells, based on receiving each of the notifications from the first cell.

14. The method of claim 13, further comprising determining which system information is reported by the one or more second cells to the first cell, based on a selected one of the at least two configurations.

15. An apparatus for controlling reporting configurations for cells of one or more wireless communications networks based on current power state of a cell, the apparatus comprising:
    means for providing reporting configuration instructions to one or more second cells, instructing the one or more second cells to select one of at least two defined configurations for reporting at least one of system information or load information to a first cell, based on whether the first cell is in a powered up state or a powered down state, wherein the at least two defined configurations comprises at least a first reporting configuration for reporting the at least one of system information or load information when the first cell is in the powered up state and a second reporting configuration for reporting the at least one of system information or load information when the first cell is in the powered down state;
    means for transmitting notifications from the first cell to the one or more second cells indicating when the first cell is transitioning to a current power state selected from the powered up state and the powered down state; and
    means for selecting one of the at least two defined configurations for interpreting data received from the second cell, based on the current power state, to obtain at least one of the system information or the load information.

16. An apparatus for controlling reporting configurations for cells of one or more wireless communications networks based on current power state of a cell, comprising:
    at least one processor configured for providing reporting configuration instructions to one or more second cells, instructing the one or more second cells to select one of at least two defined configurations for reporting at least one of system information or load information to a first cell, based on whether the first cell is in a powered up state or a powered down state, wherein the at least two defined configurations comprises at least a first reporting configuration for reporting the at least one of system information or load information when the first cell is in the powered up state and a second reporting configuration for reporting the at least one of system information or load information when the first cell is in the powered down state, transmitting notifications from the first cell to the one or more second cells indicating when the first cell is transitioning to a current power state selected from the powered up state and the powered down state, and selecting one of the at least two defined configurations for interpreting data received from the second cell, based on the current power state, to obtain at least one of the system information or the load information; and a memory coupled to the at least one processor for storing data.

17. The apparatus of claim 16, wherein the processor is further configured for transitioning to at least one of the powered up state characterized by providing wireless service to mobile entities, and the powered down state characterized by maintaining communication capability between the first cell and the one or more second cells without providing wireless service to the mobile entities.

18. The apparatus of claim 17, wherein the processor is further configured for controlling wireless service to the mobile entities at the one or more second cells, based on whether the first cell is in a powered up state or a powered down state.

19. The apparatus of claim 16, wherein the processor is further configured for broadcasting at least one of the notifications and the reporting configuration instructions to at least two of the one or more second cells.

20. The apparatus of claim 16, wherein the processor is further configured for transmitting at least one of the notifications and reporting configuration instructions using a Radio Access Network (RAN) Information Management (RIM) procedure.

21. The apparatus of claim 16, wherein the processor is further configured for providing wireless service using a first radio access technology (RAT) different from a second RAT used by the one or more second cells to provide wireless service.

22. The apparatus of claim 21, wherein the processor is further configured for transmitting at least one of the notifications and the reporting configuration instructions using an inter-RAT procedure.

23. The apparatus of claim 22, wherein the processor is further configured for formatting at least one of the notifications and the reporting configuration instructions for one or more self-organizing cells.

24. The apparatus of claim 22, wherein the processor is further configured for transmitting a cell identifier to the one or more second cells, in association with at least one of the notifications and the reporting configuration instructions.

25. The apparatus of claim 16, wherein the processor is further configured for transmitting an indication of a reason for initiating the current power state to the one or more second cells, in association with each of the notifications.

26. The apparatus of claim 16, wherein the processor is further configured for combining at least one of the notifications in a message with at least one of cell load information and system information for the first cell.

27. The apparatus of claim 16, wherein the processor is further configured for migrating idle ones of the mobile entities to one or more of the second cells, based on the system information.

28. The apparatus of claim 16, wherein the processor is further configured for determining which system information is reported by the one or more second cells, based on a selected one of the at least two configurations.

29. A computer program product for controlling reporting configurations for cells of one or more wireless communications networks based on current power state of a cell, comprising:

a non-transitory computer-readable medium comprising code for causing a computer to:

provide reporting configuration instructions to one or more second cells, instructing the one or more second cells to select one of at least two defined configurations for reporting at least one of system information or load information to the first cell, based on whether a first cell is in a powered up state or a powered down state, wherein the at least two defined configurations comprises at least a first reporting configuration for reporting the at least one of system information or load information when the first cell is in the powered up state and a second reporting configuration for reporting the at least one of system information or load information when the first cell is in the powered down state, transmit notifications from the first cell to the one or more second cells indicating when the first cell is transitioning to a current power state selected from the powered up state and the powered down state, and select one of the at least two defined configurations for interpreting data received from the second cell, based on the current power state, to obtain at least one of the system information or the load information.

30. The computer program product according to claim 29, further comprising code for causing the computer to transition to at least one of the powered up state characterized by providing wireless service to mobile entities, and the powered down state characterized by maintaining communication capability between the first cell and the one or more second cells without providing wireless service to the mobile entities.

31. The computer program product according to claim 30, further comprising code for causing the computer to control wireless service to the mobile entities at the one or more second cells, based on whether the first cell is in a powered up state or a powered down state.

32. The computer program product according to claim 29, further comprising code for causing the computer to broadcast at least one of the notifications and the reporting configuration instructions to at least two of the one or more second cells.

33. The computer program product according to claim 29, further comprising code for causing the computer to transmit at least one of the notifications and reporting configuration instructions using a Radio Access Network (RAN) Information Management (RIM) procedure.

34. The computer program product according to claim 29, further comprising code for causing the computer to transmit at least one of the notifications and the reporting configuration instructions using an inter-Radio Access Technology (inter-RAT) procedure.

35. The computer program product according to claim 34, further comprising code for causing the computer to format at least one of the notifications and the reporting configuration instructions for one or more self-organizing cells.

36. The computer program product according to claim 34, further comprising code for causing the computer to transmit a cell identifier to the one or more second cells, in association with at least one of the notifications and the reporting configuration instructions.

37. The computer program product according to claim 29, further comprising code for causing the computer to transmit an indication of a reason for initiating the current power state to the one or more second cells, in association with each of the notifications.

38. The computer program product according to claim 29, further comprising code for causing the computer to combine at least one of the notifications in a message with at least one of cell load information and system information for the first cell.

39. The computer program product according to claim 29, further comprising code for causing the computer to migrate idle ones of the mobile entities to one or more of the second cells, based on the system information.

40. The computer program product according to claim 29, further comprising code for causing the computer to determine which system information is reported by the one or more second cells based on a selected one of the at least two configurations.

* * * * *